United States Patent [19]

Powell

[11] 4,388,940
[45] Jun. 21, 1983

[54] PRESSURE RELIEF DEVICE

[75] Inventor: Walter W. Powell, Houston, Tex.

[73] Assignee: Anderson, Greenwood & Co., Bellaire, Tex.

[21] Appl. No.: 246,323

[22] Filed: Mar. 23, 1981

[51] Int. Cl.³ .............................................. F16K 13/04
[52] U.S. Cl. ................................... 137/70; 137/329.01; 137/516.29; 137/541; 137/543; 251/361; 220/89 A
[58] Field of Search ....................... 137/70, 71, 516.29, 137/541, 543, 329.01; 220/89 A, 207; 251/361

[56] References Cited

U.S. PATENT DOCUMENTS

| | | | |
|---|---|---|---|
| 2,587,933 | 3/1952 | Volpin | 137/70 |
| 3,063,467 | 11/1962 | Roberts | 137/516.29 |
| 3,319,643 | 5/1967 | Horn | 137/70 |
| 3,587,632 | 6/1971 | Clay | 137/516.29 X |
| 4,266,574 | 5/1981 | Tilling | 137/541 |

FOREIGN PATENT DOCUMENTS 479923 8/1975 U.S.S.R. .............................. 137/70

*Primary Examiner*—Harold W. Weakley
*Attorney, Agent, or Firm*—Vinson & Elkins

[57] ABSTRACT

A safety pressure relief device for a refrigerated liquified gas storage vessel having a large diameter valve seat mounted on the vessel, a valve closure movably mounted to engage the valve seat to close flow therethrough and to move away from the valve seat to relieve pressure in the vessel, a spindle extending through the seat and guided by a spider spanning the seat, a spring within the vessel biasing the valve closure toward the seat and means of preselected strength retaining the valve closure on the seat unitl a preselected maximum desired fluid pressure is reached within the vessel at which time such retaining means fails and valve closure moves to open position to provide large area relief of fluid pressure from the vessel.

12 Claims, 7 Drawing Figures

PRESSURE RELIEF DEVICE

BACKGROUND

The storage of liquified gases, such as butane, propane, anhydrous ammonia and LNG, is usually in large refrigerated storage vessels. When such vessels are exposed to sudden warming, the liquid may be vaporized at a rate faster than can be relieved with the standard overpressure protection devices. The pressure relief device of the present invention is designed to protect against abnormal pressure increases in such liquified gas storage vessels.

Prior pressure relief devices of the poppet type have generally been too small to provide adequate relief for the aforementioned abnormal pressure increases. Other large diameter relief devices which were designed to rupture to provide a large relieving area have been used but the whole disc had to be replaced each time it relieved an overpressure condition, the storage tank is vented completely and such devices are difficult to accurately select their relieving pressure and are subject to handling damage and fatigue problems.

Valves have been provided which have stem guiding below the valve member, such as shown in the P. B. Drane U.S. Pat. No. 2,557,536. A suitable soft seat used in combination with a metal-to-metal seat sealing of a valve is suggested in the I. B. Weise U.S. Pat. No. 3,406,712. Tank venting for normally liquid petroleum is provided by devices such as disclosed in the F. A. Hansen U.S. Pat. No. 2,872,938.

SUMMARY

The present invention relates to an improved pressure relief device for a liquified gas storage vessel. The improved device has a seat ring secured to the vessel with a valve closure normally seated on the seat ring and having a stem supported in a spider spanning the seat ring, a spring surrounding the stem and urging the valve closure toward seated position on the seat ring and means having a preselected strength to coact with the spring to prevent movement of the valve closure from engagement with the seat ring until a preselected pressure occurs thereunder and then releases the valve closure to open and provide large diameter relief of the vaporized liquid. After relief of the overpressure condition, the valve closure is returned to its seated position by the force of the spring and is held thereon until the pressure forces overcome the force of the spring. In the closed or seated position the preselected strength means may be replaced without opening the valve closure or venting the storage vessel.

An object of the present invention is to provide an improved pressure relief device for a refrigerated liquified gas storage vessel having large diameter pressure relief when pressure in the vessel increases to a preselected relief setting and then reseats upon completion of the relieving of the overpressure condition.

Another object is to provide an improved relief device of the type described which is substantially wholly contained within the vessel.

A further object is to provide an improved relief device of the type described in which tinkering with and resetting of the spring loading is prevented once the relief valve has been installed on a liquified gas storage vessel.

A still further object is to provide an improved relief device in which the retaining means which has a preselected strength may be replaced once it has failed without evacuating the storage vessel.

Still another object is to provide an improved relief device for a liquified gas storage vessel having a metal-to-metal seat and a resilient seat with the resilient seat being replaceable while the vessel is under pressure.

Another object is to provide an improved relief device which is not damaged by a fire on the exterior of the storage vessel.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENTS

Figure 1:
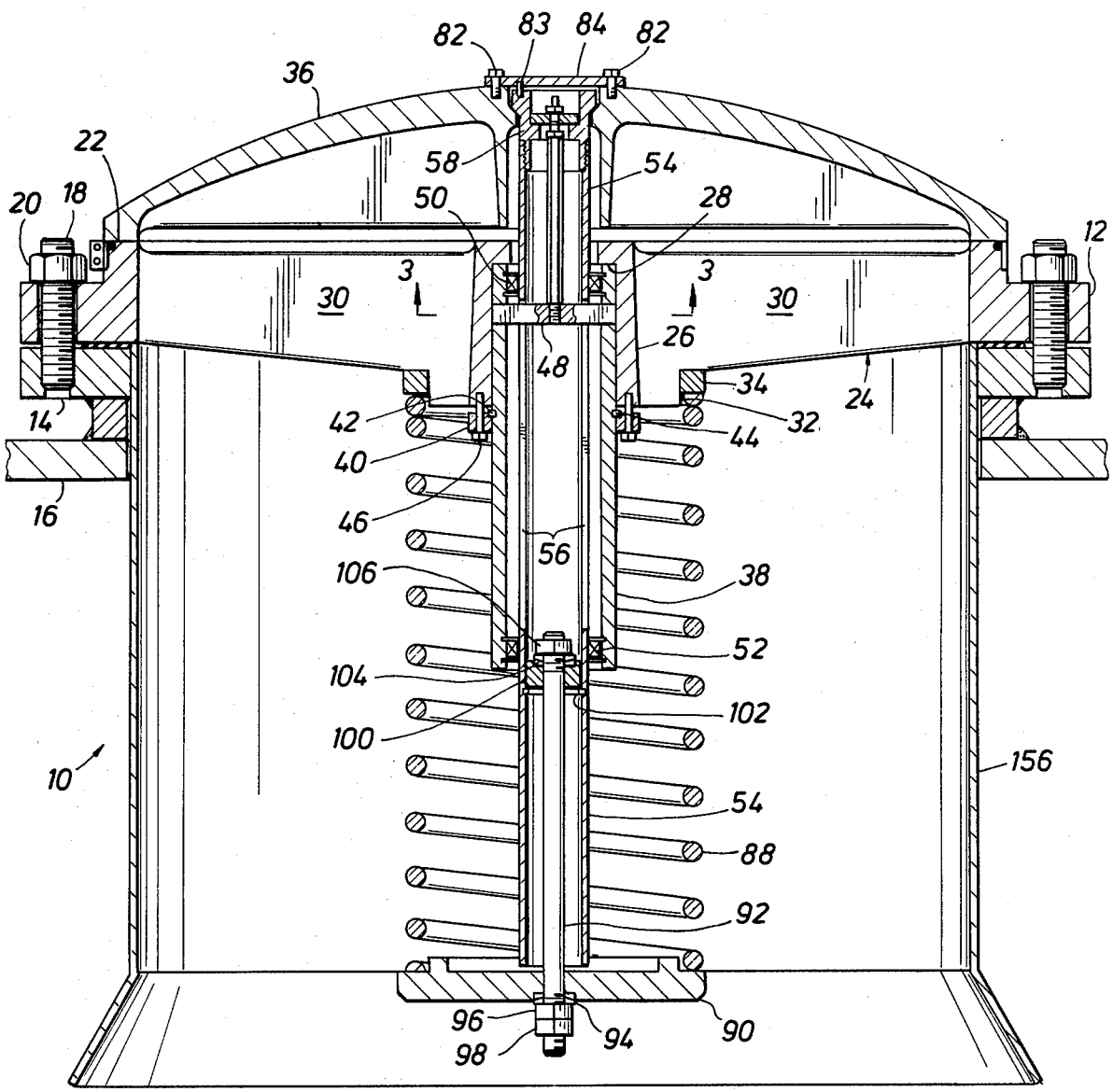
FIG. 1 is a sectional view of the preferred pressure relief device of the present invention in its closed position.

The improved pressure relief device 10 as shown in FIG. 1 includes annular flange 12 secured to flange 14 on liquified gas storage vessel 16 by studs 18 and nuts 20. Flange 12 includes upwardly facing seat 22 and spider 24 extending across its interior. Spider 24 includes central tubular member 26 which has inwardly extending flange 28 at its upper end and a plurality of legs 30 extending from member 26 to said flange 12. Legs 30 are suitably secured to flange 12 as by welding or by being integrally cast therewith. The inner portion of legs 30 extend downwardly to form extension 32 which is surrounded by washer 34 as shown.

Valve closure 36 is mounted for movement toward and away from seat 22 by suitable means, such as shown and hereinafter described, and means is provided for retaining valve closure 36 in engagement with valve seat 22 until a preselected maximum desired fluid pressure occurs within vessel 16. Guide tube 38 is retained within tubular member 26 by the engagement of clamp ring 40 with retainer ring 42 which is positioned in groove 44 on the exterior of guide tube 38. Cap screws 46 thread into tubular member 26 and hold clamp ring 40 in clamping engagement against retainer ring 42. In this position the inner end of guide tube 38 is held against flange 28. Cross bar 48 is secured in position extending diametrically across the interior of guide tube 38 and bearings 50 and 52 are suitably secured within the upper and lower interior of guide tube 38 to support and guide spindle 54 in its movement through guide tube 38 as hereinafter described. Spindle 54 is tubular in shape and includes slots 56 through which cross bar 48 extends. Thus, the movement of spindle 54 is guided by bearings 50 and 52 and cross bar 48 sliding in slots 56.

Figure 4:
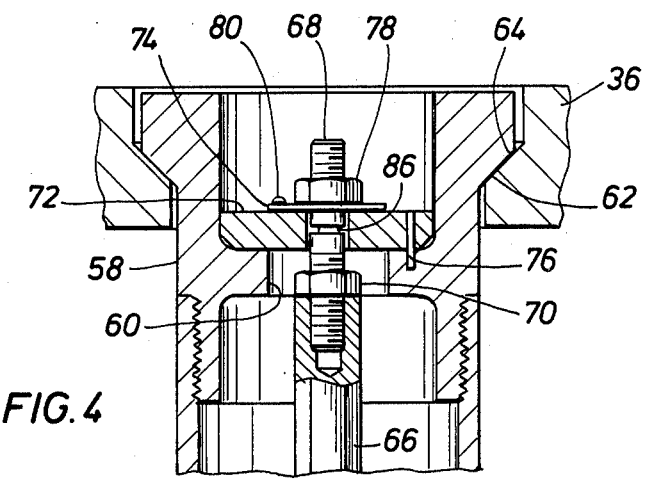
FIG. 4 is a partial detailed sectional view of the preferred valve closure retaining means of the present invention.
Figure 3:
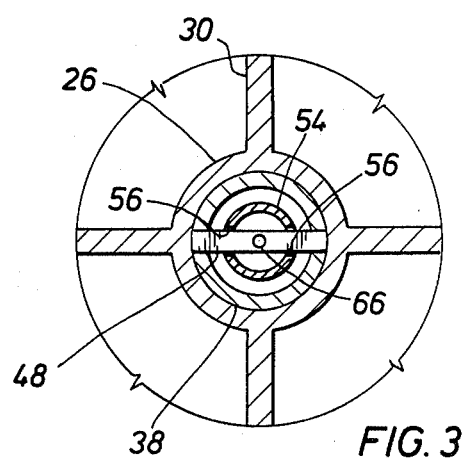
FIG. 3 is a sectional view taken along line 3—3 in FIG. 1.

Spindle top 58, as best seen in FIG. 4, is secured to the upper end of spindle 54, as by threading, welding or other suitable means, is tubular in shape, has an interior flange 60 and has outer downwardly facing shoulder 62 which engages upwardly facing seat 64 in the central portion of valve closure 36. Tension rod 66 is suitably secured, as by threading, to cross bar 48 and extends upward to connect to tension stud 68. As shown in FIG. 4, tension stud 68 is threaded into the upper end of tension rod 66 and nut 70 secures stud 68 within rod 66. Tension stud 68 extends through tension plate 72 and washer 74. Tension plate 72 is held in position on the upper side of flange 60 by pin 76. Nut 78 is threaded on tension stud 68 and engages the upper side of washer 74. Screw 80 extends through washer 74 into plate 72 to retain washer in position on plate 72. Cap screws 82 secure cover plate 84 over the opening above seat 64 in valve closure 36. Cap screws 82 are preferably lock wired and sealed to prevent unauthorized tampering with the valve parts and the setting of the valve.

Pin or key 83 is installed between spindle top 58 and cover plate 84 to assure that valve closure 36 does not rotate responsive to the vortex created when it vents.

Since tension stud 68 connects between cross bar 48 which is fixed with respect to seat 22 and spindle top 58 which engages and moves with valve closure 36, tension stud 68 provides the means of preselected strength which coacts with spring 88 to retain valve closure 36 on valve seat 22 until a preselected maximum pressure is reached within vessel 16 and thus exerted on valve closure 36. Tension stud 68 includes section 86 of reduced cross-sectional area. This area is preselected so that tension stud 68 fails in tension and releases valve closure 36 for opening to provide substantial pressure relief whenever the pressure in vessel 16 reaches a preselected maximum desired pressure which creates a force on valve closure 36 sufficient to fail stud 68 and overcome the force of spring 88.

Figure 2:
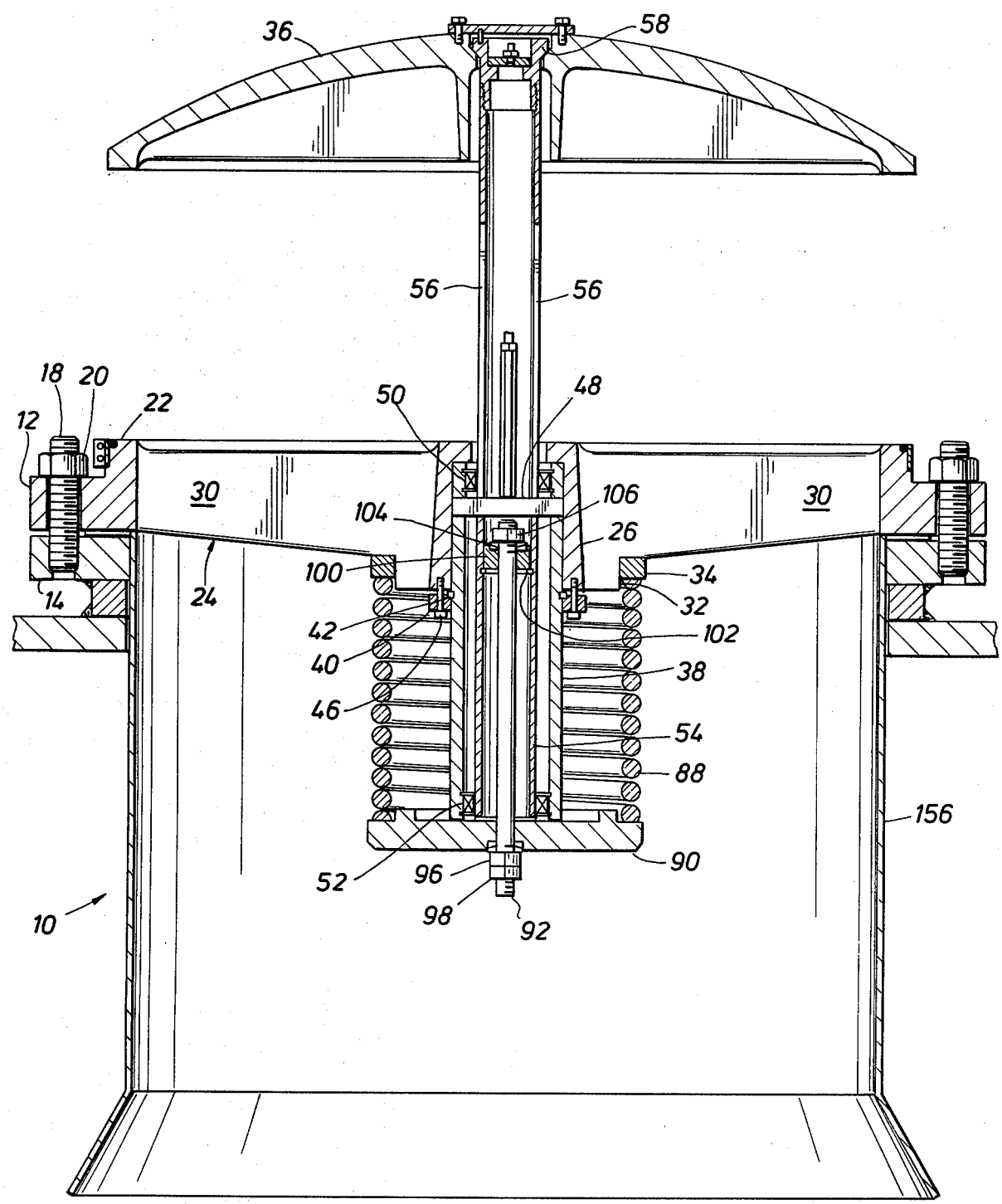
FIG. 2 is a view similar to FIG. 1 with the device in open position.

Once tension stud 68 has failed, spring 88 continues to resist opening of valve closure 36. Since stud 68 no longer resists opening, the setting of spring 88 determines the opening pressure of valve closure 36. Also, spring 88 is selected to provide the desired amount of opening with a preselected amount of overpressure in storage vessel 16 after tension stud 68 has failed. With stud 68 failed and the preselected amount of overpressure in vessel 16, valve closure 36 moves to its full open position (shown in FIG. 2). Spring 88 is mounted between washer 34 on spider 24 and washer plate 90 which is connected to spindle 54 by spring rod 92. Spring rod 92 has mounted thereon spherical washer 94 engaging the lower side of washer plate 90, nut 96 engaging washer 94 and jam nut 98 which retains nut 96 on spring rod 92. Spring rod 92 extends through washer plate 90, through bushing 100 which is secured in spindle 54 by retainer ring 102 as shown, and has spherical washer 104 and nut 106 mounted on its upper end above bushing 100. Once tension stud 68 has failed and closure plate 36 has returned to its seated position, cover plate 84 may be removed and a new tension stud 68 installed with only very slight leakage. This is possible since bearing 52 provides a substantially tight seal between guide tube 38 and spindle 54 and bushing 100 provides a similar seal between the interior of spindle 54 and spring rod 92.

Figure 5:
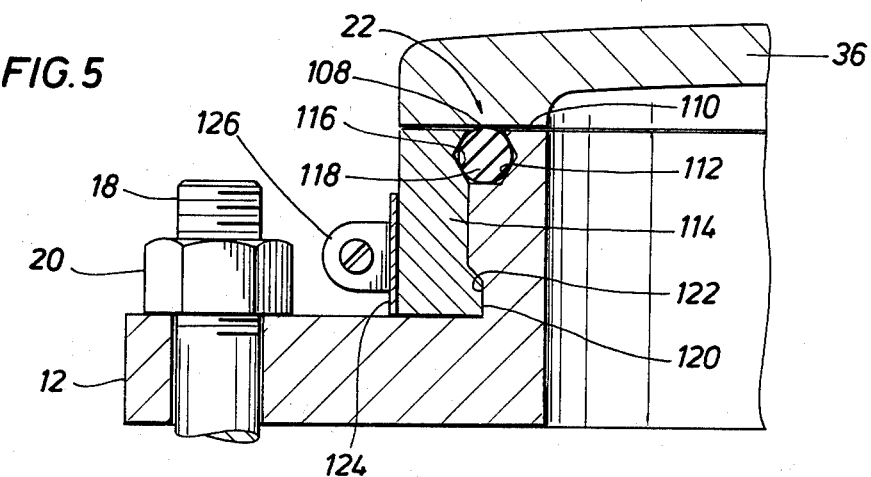
FIG. 5 is a partial detailed sectional view to illustrate the preferred seat of the relief device shown in FIG. 1.

The preferred form of seat 22 as shown in detail in FIG. 5 includes primary resilient seat 108 and secondary metal seat 110. Seat 22 includes recess 112 which is open as shown. Split ring 114 which is preferably made in two half rings includes recess 116 in its upper inner surface and which coacts with recess 112 to receive and retain resilient seat ring 118. Also split ring 114 includes projection 120 which engages in external recess 122 on seat 22 to assure proper position of split ring 114 when it is held tightly against seat 22 by clamping band 124. Clamping band 124 may be any suitable band which is sufficiently flexible to be tightened around split ring 114. Tightening mechanism 126 is provided to tighten band 124 on split ring 114.

As valve closure 36 approaches seat 22 it first engages resilient seat ring 118 to provide an initial seal and thereafter it engages secondary seat 110 to provide a metal-to-metal seal. Retaining means 68 is assembled to assure that both seats 108 and 110 are engaged by valve closure 36.

Figure 6:
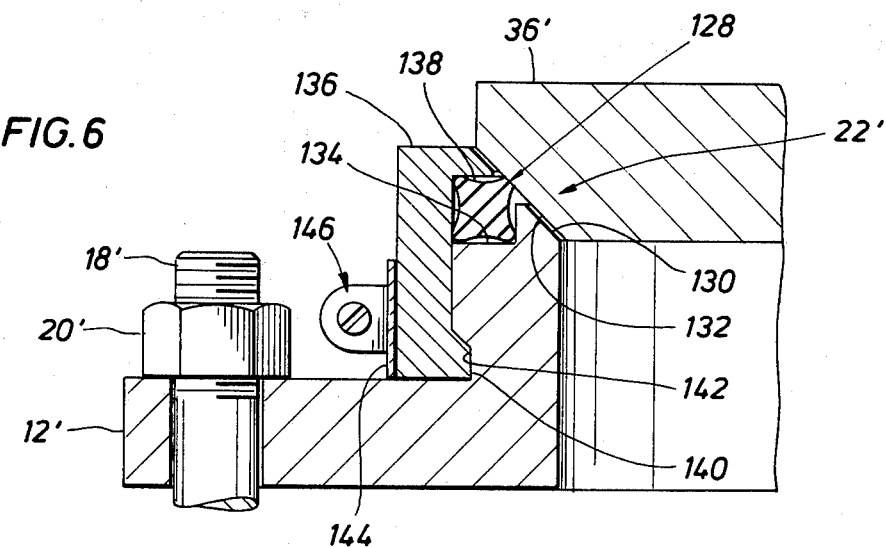
FIG. 6 is another partial detailed sectional view of a modified form of seat.

The modified form of seat 22', shown in FIG. 6, includes primary resilient seat 128 and secondary metal seat 130. Metal seat 130 is tapered inwardly and downwardly as shown and the valve closure 36' is similarly tapered at 132. The upper and outer portion of seat 22' defines recess 134 which coacts with split ring 136 to retain resilient seal ring 138 in its desired position. Seal ring 138 is shown to be a "Quad" ring with its upper inner corner projecting beyond seat 130 so that it is initially engaged by valve closure 36' before seat 130 is engaged. As shown, split ring 136 has projection 140 which coacts with recess 142 on the exterior of seat 22' to assure proper positioning of split ring 136 and seal ring 138 when flexible band 144 is tightened by its tightening mechanism 146.

Figure 7:
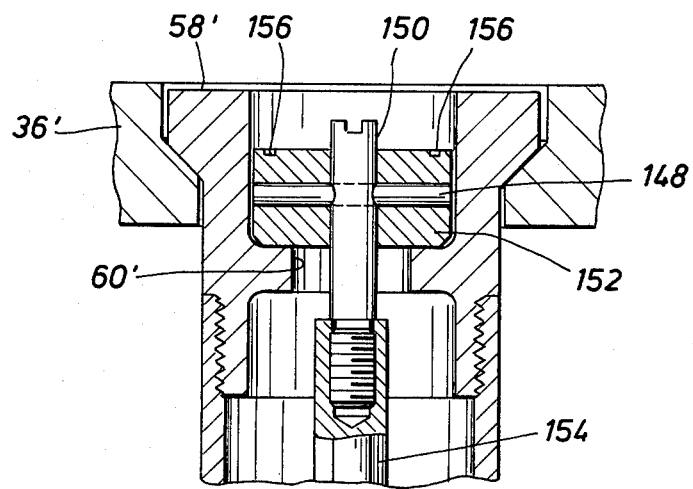
FIG. 7 is a detailed section view of a modified form of structure for presetting the relieving pressure of the improved relief device of the present invention.

A modified form of retaining means having a preselected strength is shown in FIG. 7. Such retaining means includes shear pin 148 which extends through rod extension 150 and has its ends tightly fitting in ring 152 as shown. Rod extension 150 connects to rod 154 which is the same as tension rod 66 in that it connects to cross bar 48 (not shown in FIG. 7). Ring 152 is positioned on flange 60' of spindle top 58'. Recesses 156 in the top of ring 152 are provided to rotate ring 152 for the threading of rod extension 150 into rod 154. Such retaining means and the spring force hold the valve closure on its seat until pin 148 shears and then valve closure moves to full open position as previously explained. Pin 148 is preselected to have sufficient strength in addition to the spring force to retain valve closure seated until the maximum desired pressure is reached within vessel 16. Such maximum desired pressure is selected to be below the pressure at which damage to vessel 16 may occur but above the preset pressure of the usual relief valve provided on vessel 16.

It should be noted that the exterior portions of the improved relief device of the present invention which are exposed to the interior of vessel 16 should be designed to withstand the low temperatures encountered within vessel 16. Further, the working parts of this improved relief device are all on the interior of the vessel which prevents tampering with the setting and protects such parts from fires on the exterior of the storage vessel. It is believed that improved relieving performance is provided by the inclusion of the internal duct 156 within flange 14 which assures a generally parallel flow upward through the device 10 during relieving. Duct 156 is flared outwardly at its lower end to minimize turbulence of fluid flow therein.

What is claimed is:

1. A pressure relief device for a liquified gas storage vessel comprising
   an annular flange having means for securing said flange around an opening in the upper portion of a storage vessel and an annular seat,
   a guide tube supported within said seat,
   a valve closure,
   a spindle connected to and having its outer end to support the valve closure for movement to and from said seat extending through said valve closure and its inner end extending through said guide tube,
   means having a preselected strength connecting said spindle to said tube to retain said valve closure against opening movement with respect to said annular seat, and
   biasing means engaging the inner end of said spindle to bias said valve closure toward seated position on said seat,
   said retaining means releasing its connection when the pressure within the storage vessel creates forces on said closure exceeding the preselected strength of the retaining means and the force of said biasing means to release said valve closure to open and said biasing means returns said valve closure to said seat when pressure force on said closure is less than the force of the biasing means.

2. A pressure relief device according to claim 1 wherein
   said spindle includes means for sealing against flow of fluids through and around said spindle,
   said retaining means is positioned at the outer end of said spindle so that it is replaceable without unseating said valve closure or venting fluids.

3. A pressure relief device according to claim 1 wherein said retaining means includes
   a tension stud having a section of reduced cross-sectional area and mounted so that pressure forces on said valve closure are resisted by said stud in tension,
   said stud adapted to fail in tension when a preselected maximum pressure is reached within said valve seat.

4. A pressure relief device according to claim 1 wherein said retaining means includes
   a shear pin mounted so that pressure forces on said valve closure are resisted by shear forces on said shear pin,
   said shear pin adapted to fail in shear when a preselected maximum pressure is reached within said valve seat.

5. A pressure relief device comprising
   an annular member having an annular valve seat thereon,
   said annular valve seat defines a recess at its outer upper exterior and includes
   a resilient seat,
   a metal seat,
   a split ring surrounding said valve seat and defining an inner upper recess for coacting with said valve seat recess to retain a resilient seat ring forming said resilient seat, and
   means for retaining said split ring in position around said valve seat
   a valve closure,
   means for mounting said valve closure for movement toward and away from said valve seat,
   said valve closure closing flow through said valve seat when it is engaged thereon,
   means biasing said valve closure toward closed position wherein said valve closure seats after providing relief, and
   means having a preselected strength to coact with said biasing means to retain said valve closure in engagement on said valve seat whereby when the force on the valve closure resulting from the fluid pressure within said valve seat exceeds the strength of said retaining means and the force of said biasing means said retaining means fails and said valve closure in released and moves out of engagement with said valve seat to allow pressure relieving flow through said valve seat.

6. A pressure relief device according to claim 5 wherein said resilient seat ring has a circular cross section.

7. A pressure relief device according to claim 5 wherein said resilient seat ring is a Quad ring, and said metal seat is tapered downwardly and inwardly.

8. A pressure relief according to claim 5 wherein said split ring retaining means includes
   a band surrounding said split ring, and
   means for tightening said band on said split ring.

9. A pressure relief device according to claim 5 including
   an inward projection on said split ring, and
   a recess around the exterior of said valve seat,
   said recess receiving said projection when said retaining means is tightened to assure proper positioning of said split ring of said valve seat.

10. A pressure relief device
    an annular member having an inner annular valve seat and a recess spaced radially outward from said valve seat,
    a resilient seating ring positioned in said recess,
    a valve closure,
    means for mounting said valve closure for movement toward and away from said valve seat and said resilient seating ring,
    said valve closure when closed engaging and sealing against both said valve seat and said seating ring,
    means surrounding the outer side of said recess to retain said sealing ring therein and in engagement with said valve closure,
    said retaining means being removable with said valve closure seated on said valve seat and said seating ring whereby said resilient seating ring may be replaced without disengaging said valve closure from said valve seat and including
    a split ring surrounding said recess to complete at least one side thereof, and
    means for releasably clamping said split ring in said surrounding position.

11. A device according to claim 10 wherein said valve seat is substantially flat.

12. A device according to claim 10 wherein said valve seat is tapered downward and inward and the portion of said seating ring projecting from said recess is above and outward from said valve seat whereby a tapered seating surface on said valve closure engages both said valve seat and said seating ring when seated.

* * * * *